United States Patent [19]

Finlay et al.

[11] Patent Number: 4,543,394

[45] Date of Patent: Sep. 24, 1985

[54] FLUOROELASTOMER HAVING IMPROVED COMPRESSION SET RESISTANCE

[75] Inventors: Joseph B. Finlay, Wilmington; Leo Ojakaar, Hockessin, both of Del.

[73] Assignee: E. I. Du Pont de Nemours and Company, Wilmington, Del.

[21] Appl. No.: 523,189

[22] Filed: Aug. 15, 1983

[51] Int. Cl.[4] ............................................. C08F 214/22
[52] U.S. Cl. ..................................... 525/276; 526/249
[58] Field of Search ......................... 525/276; 526/249

[56] References Cited

U.S. PATENT DOCUMENTS

| | | | |
|---|---|---|---|
| 2,944,995 | 7/1960 | Dosmann et al. | 525/276 |
| 3,088,938 | 5/1963 | Cluff | 525/276 |
| 4,035,565 | 7/1977 | Apotheker et al. | 526/249 |
| 4,115,481 | 9/1978 | Finlay et al. | 260/900 |
| 4,243,770 | 1/1981 | Tatemoto et al. | 525/331 |
| 4,320,216 | 3/1982 | Apotheker | 526/248 |

Primary Examiner—Harry Wong, Jr.

[57] ABSTRACT

A peroxide curable fluoroelastomer composition wherein the composition comprises a tetrapolymer whose interpolymerized units consist essentially of units derived from: (1) about 30–40 weight percent vinylidene fluoride, (2) about 30–40 weight percent of the fluorine-containing monomers hexafluoropropylene or pentafluoropropylene, (3) about 25–35 weight percent tetrafluoroethylene and (4) up to 3 mole percent of units, based upon the tetrapolymer, derived from a bromine-containing olefin, with the proviso that enough of such units are present to provide 0.05 weight percent bromine in the tetrapolymer, the units of the bromine-containing olefin are derived from a compound having the formula $CX_2=CX(CY_2)_n(CZ_2)_2Br$ where X is hydrogen or fluorine, Y is hydrogen, fluorine or chlorine, Z is fluorine or chlorine and n is 0–5 and said fluoroelastomer composition contains at least 1 part per hundred parts tetrapolymer of trimethallylisocyanurate.

6 Claims, No Drawings

FLUOROELASTOMER HAVING IMPROVED COMPRESSION SET RESISTANCE

BACKGROUND OF THE INVENTION

This invention relates to peroxide-curable fluoroelastomer compositions having improved compression set resistance. More specifically, the present invention is directed to certain peroxide-curable bromine-containing fluoroelastomer compositions that contain trimethallylisocyanurate thereby significantly improving the compression set resistance of vulcanizates of such compositions when such compositions have been compressed, subjected to high temperatures, and subsequently cooled and held under compression at about room temperature.

Peroxide-curable bromine-containing fluoroelastomers have been favorably accepted by the industry. Such fluoroelastomers are described in U.S. Pat. No. 4,214,060. These fluoroelastomers when cured have good resistance to damage by heat, solvents and corrosive chemicals, are especially resistant to degradation by steam, and have good compression set resistance at high temperatures of the order of about 150°–200°C. The peroxide-curable bromine-containing fluoroelastomer compositions of the present invention are frequently used under conditions in which temperature variations are extreme. When such fluoroelastomer compositions are fabricated into, for example, seals, due to the degree of crystallinity of these fluoroelastomers when the seals are subjected to alternating heating and cooling cycles, the fluoroelastomers develop poor compression set resistance at lower temperatures, e.g., room temperature, after the fluoroelastomer has been subjected to high temperatures. The result is that due to the poor compression set resistance of the fluoroelastomers at lower temperatures the seals will leak. Thus, the compression set resistance of peroxide-curable bromine-containing tetrapolymers leaves much to be desired when the vulcanizates of such compositions are heated to relatively high temperatures of the order of 200° C. and subsequently cooled while under compression and held under compression at about room temperature, which are conditions that frequently occur in use. The present invention provides a novel bromine-containing fluoroelastomer composition that retains the advantages of prior art peroxide-curable fluoroelastomers but, in addition, the fluoroelastomer compositions have improved compression set resistance at about room temperature i.e., 20°–25 °C., even after the fluoroelastomer compositions are heated to elevated temperatures of the order of about 200 °C. and then cooled to about room temperature while under compression.

SUMMARY OF THE INVENTION

The present invention is directed to a novel peroxide-curable fluoroelastomer composition wherein the composition comprises a tetrapolymer whose interpolymerized units consist essentially of units from (1) about 30–40 weight percent vinylidene fluoride, (2) about 30–40 weight percent of the fluorine-containing monomers hexafluoropropylene or pentafluoropropylene, (3) about 25–35 weight percent tetrafluoroethylene, and (4) up to 3 mole percent, based on the weight of the tetrapolymer, of units from a bromine-containing olefin with the proviso that enough of such units are present to provide at least 0.05 weight percent bromine in the tetrapolymer, the improvement which comprises units of said bromine-containing olefin are from a compound having the formula $CX_2=CX(CY_2)_n(CZ_2)_2Br$ where X is hydrogen or fluorine, Y is hydrogen, fluorine of chlorine, Z is fluorine or chlorine and n is 0–5, and said fluoroelastomer composition contains at least 1 part per hundred parts tetrapolymer of trimethallylisocyanurate. These fluoroelastomers when peroxide cured have improved compression set resistance when compressed, subjected to high temperatures, cooled and held under compression at about room temperature.

DETAILED DESCRIPTION OF PREFERRED EMBODIMENTS

The amount of trimethallylisocyanurate added to and present in the fluoroelastomer composition to improve its compression set resistance is at least 1 part per hundred parts tetrapolymer. The exact amount of trimethallylisocyanurate present in the fluoroelastomer composition will depend on its intended use. Larger amounts of trimethallylisocyanurate are used when higher cross-linking efficiency is desired and smaller amounts are used when a lower degree of cross-linking is adequate. Generally, 1–6 parts trimethallylisocyanurate per hundred parts fluoroelastomer tetrapolymer, preferably about 2–4 parts per hundred parts tetrapolymer, is added to the fluoroelastomer composition because greater amounts can cause the elastomer to blister and smaller amounts can result in insufficient cross-linking. Trimethallylisocyanurate can be prepared by adding methallyl chloride to an aqueous mixture of cyanuric acid, an acid binding agent, such as sodium or potassium hydroxide, and a copper salt, preferably a cuprous salt especially cuprous chloride, and the mixture is heated to produce trimethallylisocyanurate.

If a faster cure rate for the fluoroelastomer at a given temperature is desired, the addition of certain coagents that are polyunsaturated compounds that cooperate with the peroxide curative to provide a useful cure can be added to the fluoroelastomer composition. The amount of coagent added to the composition is, generally, between about 0.25–3.0, most often 0.5–2.5, parts per hundred parts fluoroelastomer. Representative coagents that are especially effective include N,N'-m-phenylene dimaleimide, N,N'-diallyl acrylamide, triallyl isocyanurate, triallyl cyanurate and trivinyl isocyanurate.

The fluoroelastomer is a tetrapolymer whose interpolymerized units consist essentially of from about 30–40 weight percent vinylidene fluoride, about 30–40 weight percent of the fluorine containing monomers hexafluoropropylene or pentafluoropropylene, (3) about 25–35 weight percent tetrafluoroethylene, and (4) up to 3 mole percent, based on the weight of the tetrapolymer, of units from a bromine-containing olefin of the formula $CX_2=CX(CY_2)_n(CZ_2)_2Br$ where X is hydrogen, or fluorine, Y is hydrogen, fluorine or chlorine, Z is fluorine or chlorine and n is 0–5 with the proviso that enough of such units are present to provide at least 0.05 weight percent, preferably about 0.3–1.5 weight percent, bromine in the tetrapolymer. Representative bromine-containing olefins that can be used in this invention include 4-bromo-1,1,3,3,4,4-hexafluorobutene, 4-bromo-3-chloro-1,1,3,4,4-pentafluorobutene, 6-bromo-5,5,6,6-tetrafluorohexene, 4-bromoperfluorobutene-1 and, preferably, 4-bromo-3,3,4-4-tetrafluorobutene-1. Some compounds of this type are available commercially and others can be prepared by methods known in the art, for example, as shown by Tarrant and Tandon, 34 J. Org. Chem. 864 (1969), and by Fainberg and Miller in 79 J.A.C.S. 4170 (1957).

In preparing the fluoroelastomer tetrapolymer to be used in the present composition, it is preferred that the reaction mixture of monomer components also contains a free-radical initiator, and the polymer-forming reaction is carried out as a free radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example, sodium, potassium, and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical initiators can also be used, preferably in combination with a suitable surfactant such as ammonium perfluorooctanoate. The surfactant can be selected from those known to be useful in the manufacture of fluoroelastomers. A surfactant can of course also be present when using an inorganic initiator. A suitable known chain transfer agent can also be present during the emulsion polymerization reaction, but in many cases this is not preferred.

After completion of the preferred emulsion polymerization reaction, the tetrapolymer can be isolated from the resulting polymer latex by known methods, for example by coagulation by adding an electrolyte or by freezing, followed by centrifuging or filtering and then drying the tetrapolymer.

The polymer-forming reaction can also be carried out in bulk, or in an organic liquid containing an organic free-radical initiator. It is usually preferred that none of the organic liquid present is a chain transfer agent.

During preparation of the tetrapolymer, the reaction mixture is preferably heated in a reactor which has been flushed with an inert gas at about 50°–130° C. under superatmospheric pressure, for example under a pressure of about 7–140 kg/cm$^2$, preferably about 35–105 kg/cm$^2$. In some of the most useful procedures, the polymerization is carried out as a continuous process and the reaction mixture has an average residence time in the reactor of about 5 to 30 minutes in some cases and up to 2 or 3 hours in others. Residence time can be calculated by dividing the reactor volume by the volume of latex produced per hour.

The fluoroelastomer tetrapolymers in the majority of cases will have an inherent viscosity of about 0.2 or higher, with special preference for an inherent viscosity of about 0.5–2. Inherent viscosities of the tetrapolymers can be measured at 30° C. at a tetrapolymer concentration of 0.3% by weight in methyl ethyl ketone.

One material which is usually blended with the fluoroelastomer tetrapolymer during preparation or before it is cured is at least one metal compound selected from divalent metal oxides and divalent metal hydroxides. Representative metal compounds include the oxides and hydroxides of magnesium, zinc, calcium, or lead. A metal salt of a weak acid can be used along with the oxide and/or hydroxide. Representative metal salts of weak acids include barium-, sodium-, potassium-, lead- and calcium-/-stearate, -benzoate, -carbonate, -oxalate and -phosphite. The metal compound is added to the tetrapolymer in an amount equal to about 1–15%, preferably about 2–10%, by weight of the tetrapolymer content. Metal compounds that are useful are further described by Bowman in U.S. Pat. No. 3,686,143.

In preparing the present fluoroelastomer composition, exclusive of peroxide curative, one can mix the tetrapolymer with trimethallylisocyanurate and other ingredients, e.g. fillers, by means of any mixing apparatus known to be useful for preparing rubber or plastic compositions; for example, one can use a roller-type rubber mill or Banbury mixer equipped to operate at a temperature below the decomposition temperature of the fluoroelastomer composition.

The resulting fluoroelastomer tetrapolymer composition can be cured by mixing the vinylidene fluoride-containing tetrapolymer containing at least 1 part per hundred parts tetrapolymer of trimethallylisocyanurate with an organic peroxide curing agent by any conventional means. Preferably a dialkyl peroxide is used. An organic peroxide is selected which will function as a curing agent for the composition in the presence of the other ingredients which are present in the end-use fluoroelastomer composition and under the temperatures used in the curing operation without causing any harmful amount of curing during mixing or other operations which precede the curing operation. A dialkyl peroxide which decomposes at a temperature above 50° C. is especially preferred when the composition is to be subjected to processing at elevated temperatures before it is cured. In many cases one will prefer to use a di-tertiarybutyl peroxide having a tertiary carbon atom attached to a peroxy oxygen to cure the fluoroelastomer. Among the most useful peroxides of this type are 2,5-dimethyl-2,5-di(tertiarybutylperoxy)hexyne-3 and 2,5-dimethyl-2,5-di(tertiarybutylperoxy) hexane. Other representative peroxides that can be used include dicumyl peroxide, dibenzoyl peroxide, tertiary butyl perbenzoate and the like.

To illustrate an application where one can use a peroxide compound which decomposes at or below 50° C., one can carry out the steps of preparing the composition at room temperature as a liquid film-forming composition containing an organic solvent and/or diluent, applying a layer of the liquid composition to a substrate, and allowing the layer to become dried and cured at or below 50° C.

One will usually prefer to employ a peroxide content of about 1.5–5% based on the weight of the fluoroelastomer.

The fluoroelastomer composition can also contain one or more additives such as those known to be useful in fluoroelastomer compositions, for example, pigments, fillers and pore-forming agents.

The composition can be cured by subjecting it to conditions which result in the decomposition of the organic peroxide, for example, by heating the composition at a temperature which causes the peroxide to decompose. The initial curing of the curable composition in most cases is preferably carried out by heating the composition for about 1–60 minutes at about 150°–200° C.; conventional rubber- and plastic-curing presses, molds, extruders, and the like provided with suitable heating and curing means can be used. Also, if one wants a product having maximum heat resistance and dimensional stability, it is preferred to carry out a post-curing operation wherein the article is heated in an oven or the like for an additional period of about 1–48 hours at about 180°–300° C. One skilled in the art will realize that the best curing time and temperature for a particular application will depend on such factors as the nature and proportion of ingredients and the properties needed in the final product.

Fluoroelastomer compositions can easily be made in accordance with the present invention in vulcanizable grades suitable for compounding and curing by practical and economical methods to yield highly useful cured elastomer articles for applications such as films, gaskets, O-rings, coated fabrics, wire insulation, hoses, protective coatings and the like, which have good creep-resistance and good resistance to damage by heat, solvents and corrosive chemicals. Most importantly, the fluoroelastomer compositions of the present invention give vulcanizates with improved compression set resistance measured at about room temperature after the fluoroelastomers have been subjected to high temperatures of the order of about 150°–200° C. and cooled under compression and held at about room temperature, as compared with compositions otherwise the same but containing triallylisocyanurate in place of trimethallylisocyanurate.

The following examples demonstrate various embodiments of the present invention in which the fluoroelastomers contain trimethallylisocyanurate and their unexpected superiority over compositions containing triallylisocyanurate. All parts and percentages are by weight unless otherwise specified.

EXAMPLE 1

A curable fluoroelastomer composition is prepared by mixing the following on a 4×6 in (10×15 cm) two-roll rubber mill with rolls at about 25° C.: 100 parts of tetrapolymer A (tetrafluoroethylene/vinylidene fluoride/hexafluoropropylene/4-bromo-3,3,4,4-tetrafluorobutene-1, tetrapolymer (29/35/34/2), 30 parts MT carbon black, 3 parts PbO, 3 parts 45% 2,5-dimethyl-2,5-di(t-butylperoxy)hexane and 55% inert filler (peroxide curing agent Luperco 101 XL) and 3 parts trimethallylisocyanurate (TMAIC), or 3 parts of triallylisocyanurate (TAIC) for the Control. Samples are formed from the fluoroelastomer compositions into the shape of pellets as described in ASTM D 395 or into O-rings having an outside diameter of 2.5 cm and a cross-sectional diameter of 0.35 cm for use in compression set testing and into slabs about 0.2 cm thick for stress-strain measurement. The resulting samples are press-cured in an electrically-heated press for 15 minutes at 177° C. and post-cured in a circulating-air oven for 24 hours at 232° C. Samples A were post-cured in air and Samples B were post-cured under a nitrogen atmosphere.

Compression set resistance values show little difference between the sample compositions of the invention and those of the control when tested only at elevated temperatures as illustrated below in Samples A and B in Table I. However, a significant difference in compression set resistance is observed when the test specimens are first heated to elevated temperatures under the usual 25% compression and then cooled to about room temperature (25°C.) and held at this temperature for two hours while still compressed, before measuring compression set resistance, as shown below in the Tables II and III. Even greater differences are observed when the samples are post-cured under nitrogen prior to compression set testing, i.e. Samples B. Also, the fluoroelastomer composition of the present invention containing TMAIC, rather than TAIC, has improved tensile strength and elongation at break as shown in Table IV.

TABLE I

|  | Example 1 | Control |
| --- | --- | --- |
| Tetrapolymer A | 100 | 100 |
| MT carbon black | 30 | 30 |
| Litharge (PbO) | 3 | 3 |
| Luperco 101 XL | 3 | 3 |
| Trimethallylisocyanurate (TMAIC) | 3 | — |
| Triallylisocyanurate (TAIC) | — | 3 |
| Compression Set Resistance[1] % |  |  |
| Sample A, Pellets | 31 | 33 |
| O-rings | 35 | 38 |
| Sample B, Pellets | 16 | 14 |
| O-rings | 24 | 22 |

[1]Compression set resistance test determined on pellets and O-rings according to ASTM Test D 395-61 Method B where sample is heated to 200° C. for 70 hours.

TABLE II

| Compression Set Resistance[2] % | Example 1 | Control |
| --- | --- | --- |
| Sample A, Pellets | 51 | 54 |
| O-rings | 49 | 56 |
| Sample B, Pellets | 37 | 44 |
| O-rings | 29 | 41 |

[2]Compression set resistance test determined on pellets and O-rings according to ASTM Test D 395-61 Method B with the modification that the samples were heated to 200° C. for 24 hours and cooled to 25° C. and held at this temperature for 2 hours before releasing from the compression device and measuring compression set resistance.

TABLE III

| Compression Set Resistance[3] % | Example 1 | Control |
| --- | --- | --- |
| Sample A, Pellets and | 43 | 45 |
| O-rings | 38 | 46 |
| Sample B, Pellets and | 31 | 44 |
| O-rings | 23 | 35 |

[3]Compression set resistance test determined on pellets and O-rings according to ASTM Test D 395-61 Method B with the modification that the samples were heated to 150° C. for 24 hours and cooled to 25° C. and held at this temperature for 2 hours before releasing from the compression device and measuring compression set resistance.

TABLE IV

| Stress/Strain Properties[4] | Example 1 | Control |
| --- | --- | --- |
| Cured 15 min./177° C., post-cured 24 hr/232° C. |  |  |
| $M_{100}$ (MPa) | 9.65 | 8.65 |
| $T_B$ (MPa) | 20.4 | 16.9 |
| $E_B$ (%) | 180 | 160 |
| Set at Break (%) | 5 | 3 |
| Heat-Aged 70 hrs./275° C. |  |  |
| $M_{100}$ (MPa) | 8.6 | 3.8 |
| $T_B$ (MPa) | 15.2 | 9.3 |
| $E_B$ (%) | 180 | 200 |
| Set at Break (%) | 5 | 5 |

[4]ASTM D412-80

Example 2

Curable fluoroelastomer compositions are prepared and cured as described in Example 1. In addition, the coagents N,N'-m-phenylene-bis-maleimide or triallylcyanurate are added to the compositions in the amounts indicated in Table V. As shown in Table V in addition to the good compression set resistance obtained, the rate of cure of the fluoroelastomer composition is substantially increased as indicated in the results shown in the ODR test.

TABLE V

| | | | | |
|---|---|---|---|---|
| Tetrapolymer A | 100 | 100 | 100 | 100 |
| MT carbon black | 30 | 30 | 30 | 30 |
| Litharge | 3 | 3 | 3 | 3 |
| Luperco 101 XL | 3 | 3 | 3 | 3 |
| Trimethallylisocyanurate | 3 | 3 | 3 | 1.5 |
| Triallylcyanurate | — | — | — | 1.5 |
| N,N'—m-phenylene-bis-maleimide | — | 0.5 | 1.0 | — |
| Oscillating Disc Rheometer (ODR) | | | | |
| ASTM D2084-81 | | | | |
| 12" Trace/177° C. Micro die 1° Arc | | | | |
| $t_s2$, min. | 2.9 | 2.3 | 1.8 | 2.0 |
| $t_c90$, in-lb | 38 | 35 | 32 | 38.6 |
| $M_c90$, min. | 9.3 | 7.9 | 7.8 | 7.0 |
| Max Rate, in-lb/min. | 45 | 39 | 37 | 42 |
| Stress/Strain | | | | |
| Cured 15 min./177° C., post-cured 24 hrs./232° C. | | | | |
| $M_{100}$ (MPa) | 9.7 | 10.3 | 10.0 | 8.3 |
| $T_B$ (MPa) | 20.3 | 20.0 | 20.7 | 20.4 |
| $E_B$ (%) | 180 | 170 | 180 | 150 |
| Set at Break (%) | 5 | 4 | 5 | 2 |
| Heat-Aged 70 hrs./275° C. | | | | |
| $M_{100}$ (MPa) | 8.6 | 8.3 | 6.9 | 6.2 |
| $T_B$ (MPa) | 15.2 | 15.9 | 13.1 | 15.3 |
| $E_B$ (%) | 180 | 170 | 210 | 210 |
| Set at Break (%) | 5 | 4 | 5 | 4 |
| Compression Set Resistance of Pellets[1], % | | | | |
| 70 hrs at 25° C. | 29 | 25.4 | 26.9 | 31 |
| 70 hrs at 200° C. | 55 | 39 | 38.8 | 32 |

[1]Compression set resistance determined according to ASTM Test D 395-61 Method B.

We claim:

1. In a peroxide-curable fluoroelastomer composition wherein the composition comprises a tetrapolymer whose interpolymerized units consist essentially of (1) about 30–40 weight percent vinylidene fluoride, (2) about 30–40 weight percent of the fluorine-containing monomers hexafluoropropylene or pentafluoropropylene (3) about 25–35 weight percent tetrafluoroethylene, and (4) up to 3 mole percent, based upon the tetrapolymer, of a bromine-containing olefin, with the proviso that enough of such units are present to provide at least 0.05 weight percent bromine in the tetrapolymer, wherein said bromine-containing olefin is a compound having the formula $CX_2=CX(CY_2)_n(CZ_2)_2Br$ where X is hydrogen or fluorine, Y is hydrogen, fluorine or chlorine, Z is fluorine or chlorine and n is 0–5, and said fluoroelastomer composition contains from about 1–6 parts per hundred parts tetrapolymer of trimethallylisocyanurate.

2. A fluoroelastomer composition of claim 1 wherein the bromine-containing olefin of the tetrapolymer is 4-bromo-3,3,4,4-tetrafluorobutene-1.

3. A fluoroelastomer composition of claim 1 wherein the fluorine-containing monomer of the tetrapolymer is hexafluoropropylene.

4. A fluoroelastomer composition of claims 1 or 2 containing about 2–4 parts per hundred parts tetrapolymer of trimethallylisocyanurate.

5. A fluoroelastomer composition of claim 1 additionally containing 0.25–3 parts per hundred parts tetrapolymer of a coagent wherein said coagent is N,N'-m-phenylene dimaleimide.

6. A fluoroelastomer composition of claim 1 additionally containing 0.25–3 parts per hundred parts tetrapolymer of a coagent wherein said coagent is triallylcyanurate.

* * * * *